Aug. 20, 1929.  L. J. STACY ET AL  1,725,022

ALARM

Filed Sept. 10, 1927

INVENTORS: LELAND J. STACY
MYRON E. KROM

By John A. Hall
ATTORNEY

Patented Aug. 20, 1929.

1,725,022

UNITED STATES PATENT OFFICE.

LELAND J. STACY, OF CALDWELL, AND MYRON E. KROM, OF MADISON, NEW JERSEY, ASSIGNORS TO BELL TELEPHONE LABORATORIES, INCORPORATED, OF NEW YORK, N. Y., A CORPORATION OF NEW YORK.

ALARM.

Application filed September 10, 1927. Serial No. 218,697.

This invention relates to electrical indicating devices, and is particularly adapted for use as an alarm circuit for indicating the rise or fall of the terminal voltage or a change in frequency of an alternating current generator above or below a predetermined point.

It has been determined by investigators of electrical phenomena that when an alternating current generator is connected in series with an iron core coil and a condenser and the voltage is gradually raised that the current slowly increases until a certain point is reached, whereupon a further increase in the voltage of even slight degree results in a sudden and great increase in current. This is spoken of as the "jumping phenomena in ferro-resonance", and is described more in detail in an article entitled "On the jumping phenomena in ferro-resonance" by Yasusi Watanabe in the Tohoku University Technological Reports, 1925. Applicants make use of this phenomenon by placing a cheap and comparatively insensitive relay in series with such a circuit to indicate the rise of the voltage of a generator above a predetermined point, thus replacing with inexpensive but reliable apparatus the ordinarily used but expensive voltmeter relay type of apparatus or voltage regulation means. The same circuit may be used to indicate the fall of the voltage below a predetermined point or a change in frequency from a predetermined value.

Applicants' invention further contemplates the use of auxiliary apparatus for conditioning the alarm circuit since the phenomenon which they employ is not reversible. Hence, means are employed to place the circuit in condition for operation when the source of alternating current is first connected to such circuit.

The invention also contemplates the use of means to automatically compensate for a change in frequency where the circuit is arranged to respond to a change in voltage.

Figure 1:
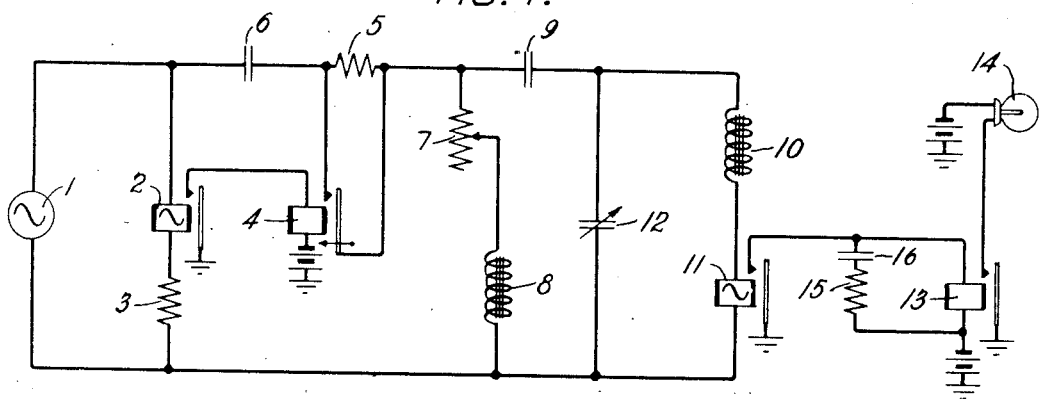
Figure 2:
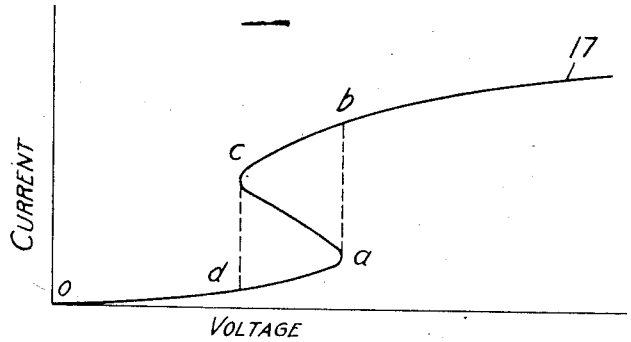
Figure 3:
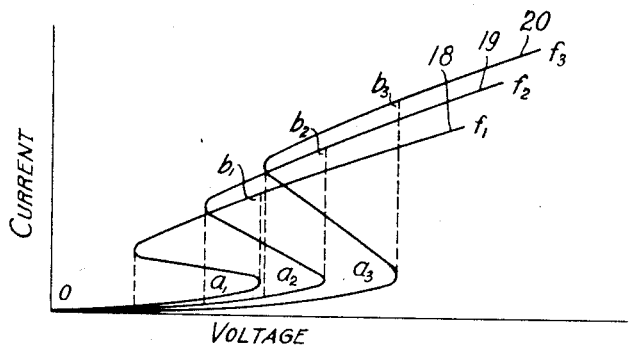

In the drawings Fig. 1 is a diagrammatic representation of a circuit arrangement employing this invention. Fig. 2 is a curve showing the relation between the voltage and current in a circuit including a condenser and an iron core coil in series with a source of alternating current, and Fig. 3 is a nest of curves similar to that shown in Fig. 2, the different curves of Fig. 3 illustrating the effect of change of frequency.

Referring specifically to Fig. 1, a source of alternating current 1 is shown connected to apparatus which will finally result in the display of a signal lamp 14. Connected across the terminals of the source of alternating current 1 is a relay 2 responsive to alternating current in series with a resistance 3. This relay will respond when the alternating current from source 1 begins to flow and in responding closes an obvious circuit for a slow operating relay 4. Relay 4 when energized short-circuits a resistance 5, the purpose of which will appear hereinafter. Also bridged across the terminals of the source of alternating current 1 is a condenser 6 in series with a variable resistance 7 and a reactance element 8. This series arrangement constitutes a potentiometer whereby the difference of potential across the impedance element 8 and resistance 7 constitutes but a part of the total potential of the source 1. A condenser 9, an iron core coil 10 and a relay 11 in series are connected in parallel with the variable resistance 7 and the impedance element 8. With the potential of the source 1 at a normal point relay 11 remains unoperated but when the potential of source 1 rises above a predetermined value, relay 11 operates and closes an obvious circuit for relay 13 which in turn closes an obvious circuit for signal lamp 14 which here represents any form of alarm which may be desired. The condenser 16 and resistance 15 bridged across the winding of relay 13 are provided to prevent undue sparking at the contacts of relay 11. This network also acts as a means for maintaining a steady contact in the circuit of signal lamp 14 since the contacts of relay 11 may chatter especially if relay 11 is energized by low frequency alternating current such as ringing current used in telephone exchanges.

The potentiometer arrangement including the condenser 6 and reactance element 8 is used to compensate for a change in frequency in the source of alternating current 1. As the frequency rises the percentage of the voltage as measured by the inductance of element 8 rises so that with an ordinary alternating current generator 1 where both the potential and frequency depend on the speed, if the speed should increase and consequently increase the frequency, the potential across reactance element 8 will rise considerably faster than the potential across the terminals of the source 1. The purpose of this will be explained more in detail hereinafter.

The resistance 7 and the variable condenser 12 are provided to adjust the circuit so that where commercial condensers such as 9 and commercial iron core coils such as 10 are used, the circuit may be adjusted so that relay 11 will operate within close limits at a predetermined point. These elements, of course, are not necessary if the other elements are very carefully selected and even where they are used they are only varied or adjusted when the arrangement is installed, and thereafter they remain set.

When the alternating current generator 1 is started in operation and connected to the circuit as shown by means of any ordinary type of switches (not shown) the initial rush of current due to various factors of the circuit such as charging the condenser and so forth, might cause relay 11 to attract its armature and since the phenomenon on which this invention is based is not reversible within commercial limits, some means must be provided to limit such initial rush of current. This means is found in the resistance 5 which is normally included in series with the arm of the potentiometer constituting condenser 6. Therefore when this circuit is connected to generator 1, the initial current flowing through relay 11 will be small. However, relay 2 will immediately become energized and will close the circuit for slow operating relay 4. In a short interval of time relay 4 will attract its armature and thereupon short-circuit the resistance 5 so as to put the circuit in its normal condition.

The phenomenon on which the operation of this circuit depends may be explained through the use of the curve 17 shown in Fig. 2. If the voltage of the generator 1 is slowly raised, the current through relay 11 will slowly rise until point $a$ has been reached. If at this point the voltage is then raised by even an extremely small amount, the current in relay 11 will immediately jump from the value at the point $a$ to the value at point $b$ and thereafter any further increase in the voltage will cause an increase in the current along the curve 17. If now the voltage is lowered the current will slowly fall even after the voltage has fallen below the point shown by the dotted line from $a$ to $b$ and it is not until the point $c$ is reached that any radical change is noted. At this point, however, if the voltage is lowered by even a very small amount the current will immediately jump from its value at the point $c$ to its value at point $d$.

By means of this phenomenon then the relay 11 which may be a comparatively insensitive relay and which will not respond to a current flow equal to that indicated at point $a$, will respond easily to the current value indicated by the point $b$. If the circuit therefore is designed and adjusted so that the normal voltage of the generator 1 is just slightly below the voltage indicated by the point $a$, the relay 11 may be used to indicate a rise in voltage because upon such rise it will pass the point $a$ and the current will jump to such a value that relay 11 will operate and cause the display of signal lamp 14.

It has been found also that this jumping phenomenon changes with the frequency. For instance, curve 18 shows the relation between the current and the voltage at frequency $f_1$, curve 19 shows the same relation at frequency $f_2$ and curve 20 shows the same relation at frequency $f_3$. If only the condenser 9 and impedance element 10 were used and the source 1 were to increase its frequency then the response of relay 11 would be in such a manner that it would take a voltage as indicated at $a_2$ or $a_3$ to operate relay 11 instead of the voltage as indicated at $a_1$. This would defeat the purpose of the alarm circuit for voltage indication and therefore the condenser 6 and impedance element 8 are used so that when the frequency of source 1 increases the voltage across the series comprising condenser 9, impedance element 10 and relay 11 will increase to a greater extent so that the response of relay 11 will be always practically at the same point.

What is claimed is:

1. An alarm circuit for indicating a unidirectional change of small degree in the voltage of a source of alternating current from a given point comprising a condenser, an iron core coil and a relay in series relation, a resistance coil in series with said elements and a relay responsive to current from said source for short-circuiting said resistance element.

2. An alarm circuit for indicating a unidirectional change of small degree in the voltage of a source of alternating current from a given point comprising a condenser, an iron core coil and a relay in series relation, a resistance coil in series with said elements and a slow acting relay responsive to current from said source for short-circuiting said resistance coil a predetermined interval of time after said source of current is connected to said elements.

3. An alarm circuit for indicating a unidirectional change of small degree in the voltage of a source of alternating current from a given point, comprising a condenser, an iron core coil and a relay in series, a source of alternating current and a potentiometer circuit interposed between said source of current and said alarm circuit, said potentiometer circuit comprising a condenser and an impedance coil in series connected to said source and having connections at either terminal of said impedance coil for said alarm circuit.

4. An alarm circuit for indicating a unidirectional change of small degree in the voltage of a source of alternating current from a predetermined point comprising a condenser, an iron core coil and a comparatively insensitive relay in series relation with said source of alternating current and means for impeding the current flow in said relay during the charging time of said condenser.

5. An alarm circuit for indicating a unidirectional change of small degree in the voltage of a source of alternating current from a given point comprising a condenser, an iron core coil and a relay in series relation and means to predetermine said point.

6. An alarm circuit for indicating a unidirectional change of small degree in the voltage of a source of alternating current from a given point comprising a condenser, an iron core coil and a relay in series relation and means to adjust said circuit to compensate for variations in the constants of said elements to fix said point.

7. An alarm circuit for indicating a unidirectional change of small degree in the voltage of a source of alternating current from a given point comprising a condenser, an iron core coil and a relay in series relation and an auxiliary condenser to predetermine said point.

8. An alarm circuit for indicating a unidirectional change of small degree in the voltage of a source of alternating current from a given point comprising a condenser, an iron core coil and a relay in series relation and an auxiliary condenser bridged around said iron core coil and said relay to adjust said circuit to compensate for variations in the constants of said elements to fix said point.

9. An alarm circuit for indicating a unidirectional change of small degree in the voltage of a source of alternating current from a given point comprising a condenser, an iron core coil and a relay in series relation and a variable condenser and a variable resistance to adjust said circuit to compensate for variations in the constants of said elements to fix said point.

10. An alarm circuit for indicating a change of small degree in the voltage of a source of alternating current above a predetermined point comprising a condenser, an iron core coil and a relay in series relation with said source of current.

In witness whereof, we hereunto subscribe our names this 8th day of September A. D., 1927.

LELAND J. STACY.
MYRON E. KROM.